(12) United States Patent
Chadwick et al.

(10) Patent No.: US 10,258,181 B2
(45) Date of Patent: Apr. 16, 2019

(54) PORTABLE SUPPORTING DEVICE

(71) Applicant: DINK (2015) LIMITED, Oldham (GB)

(72) Inventors: Daniel Chadwick, Oldham (GB); Shane Boswell, Oldham (GB)

(73) Assignee: DINK (2015) LIMITED, Thornham, Oldham (GB)

( * ) Notice: Subject to any disclaimer, the term of this patent is extended or adjusted under 35 U.S.C. 154(b) by 0 days.

(21) Appl. No.: 15/568,914

(22) PCT Filed: Apr. 15, 2016

(86) PCT No.: PCT/GB2016/051052
§ 371 (c)(1),
(2) Date: Oct. 24, 2017

(87) PCT Pub. No.: WO2016/170307
PCT Pub. Date: Oct. 27, 2016

(65) Prior Publication Data
US 2018/0110352 A1    Apr. 26, 2018

(30) Foreign Application Priority Data

Apr. 24, 2015 (GB) .................................. 1507053.5

(51) Int. Cl.
*A47G 29/08* (2006.01)
*F16B 2/12* (2006.01)

(52) U.S. Cl.
CPC .............. *A47G 29/083* (2013.01); *F16B 2/12* (2013.01)

(58) Field of Classification Search
CPC ...... A47G 29/083; A47G 25/08; A47G 25/12; Y10S 248/914; A45B 1/04; F16B 2/12; A45F 5/00
See application file for complete search history.

(56) References Cited

U.S. PATENT DOCUMENTS

| 222,086 | A | * | 11/1879 | Slemmer | ............... | A47F 5/0846 |
| | | | | | | 248/227.1 |
| 815,893 | A | * | 3/1906 | Adams et al. | ......... | A47G 25/10 |
| | | | | | | 211/181.1 |
| 1,420,724 | A | * | 6/1922 | Marona | ................... | A47J 45/02 |
| | | | | | | 248/227.2 |

(Continued)

FOREIGN PATENT DOCUMENTS

| CH | 216 084 A | 7/1941 |
| DE | 471 831 C | 2/1929 |
| JP | H10 113275 A | 5/1998 |

OTHER PUBLICATIONS

International Search Report and Written Opinion for corresponding Patent Application No. PCT/GB2016/051052 dated Jul. 25, 2016.

*Primary Examiner* — Bradley Duckworth
(74) *Attorney, Agent, or Firm* — Renner, Otto, Boisselle & Sklar LLP

(57) ABSTRACT

A portable supporting device comprising a body portion (12*a*, 12*b*) and a clamp mechanism having two jaws (16, 24) with a variable distance therebetween. The first (16) of the two jaws (16, 24) is connected to the body section (12*a*, 12*b*) and the second (24) of the two jaws (16, 24) is connected to a stem (18) that is at least partially housed within the body section (12*a*, 12*b*). The stem (18) moves within the body section (12*a*, 12*b*) to adjust the distance between the two jaws (16, 24). The device further comprises a hook mechanism (26).

10 Claims, 2 Drawing Sheets

(56) References Cited

U.S. PATENT DOCUMENTS

| | | | | |
|---|---|---|---|---|
| 1,688,148 | A * | 10/1928 | Martin | B60Q 7/00 211/86.01 |
| 2,920,369 | A * | 1/1960 | Zezula | A47G 29/083 24/490 |
| 3,376,006 | A * | 4/1968 | Zezula | A47G 29/083 248/227.2 |
| 3,767,152 | A * | 10/1973 | Killinger | A47G 29/083 24/298 |
| 3,959,854 | A * | 6/1976 | Lewis | A47B 13/086 160/330 |
| 4,098,479 | A * | 7/1978 | Hartstone | F16B 2/12 248/214 |
| 4,210,302 | A * | 7/1980 | Serkez | A45F 5/00 248/205.1 |
| 4,300,742 | A * | 11/1981 | Hunn | A47G 25/12 248/229.26 |
| 5,000,418 | A * | 3/1991 | Vogt | A45B 1/04 248/205.1 |
| 5,094,417 | A * | 3/1992 | Creed | A47G 29/083 248/215 |
| 5,582,377 | A * | 12/1996 | Quesada | A47F 5/083 24/343 |
| 7,175,143 | B1 * | 2/2007 | Ho | A47G 29/083 248/215 |
| 7,828,258 | B2 * | 11/2010 | Shigio | A47G 29/083 223/120 |
| 8,371,546 | B2 * | 2/2013 | Bauerly | A47G 29/083 24/265 H |
| 2005/0056746 | A1 | 3/2005 | Landver | |
| 2007/0114350 | A1 * | 5/2007 | Sorci | F16B 45/00 248/304 |
| 2014/0339386 | A1 * | 11/2014 | Rife | A47G 29/083 248/227.2 |

* cited by examiner

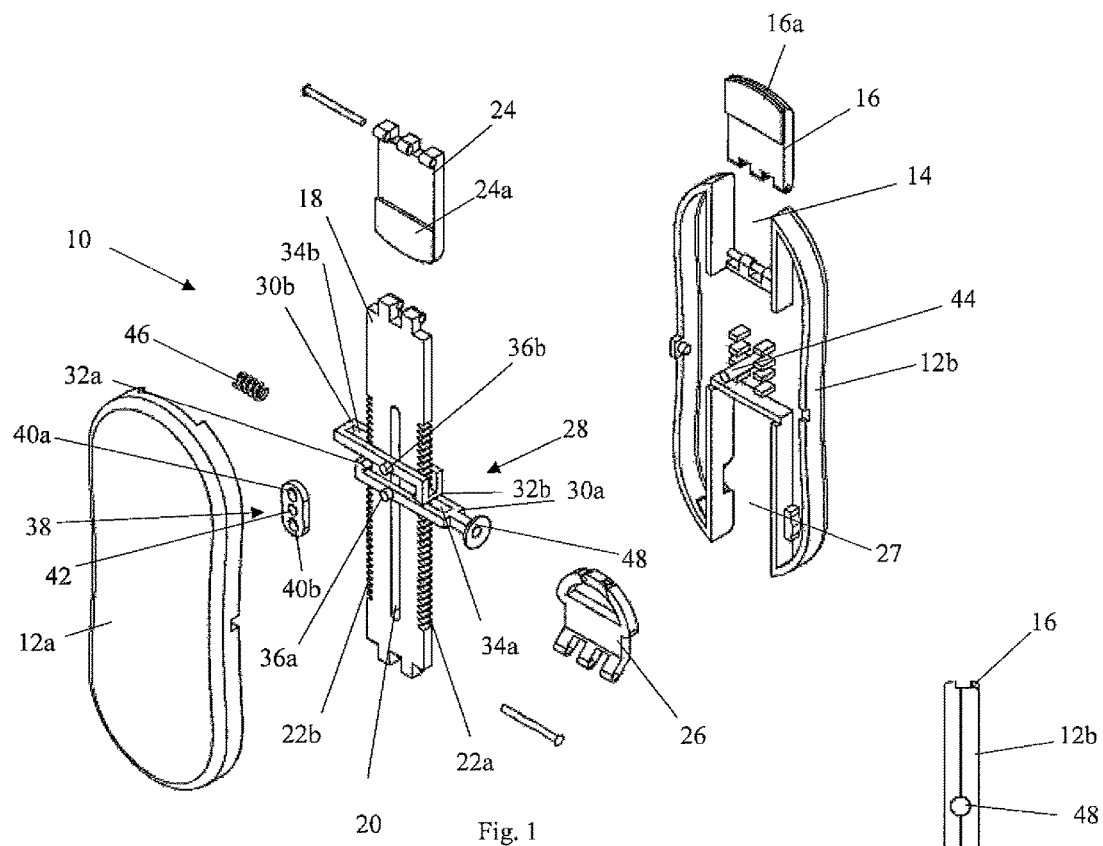
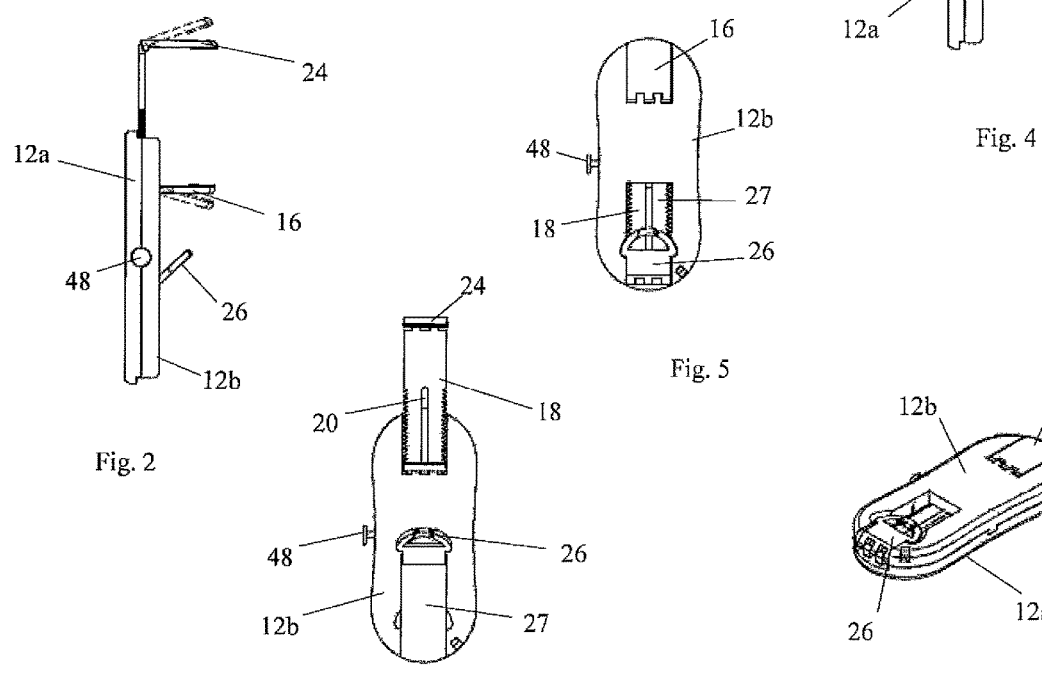

PORTABLE SUPPORTING DEVICE

This application is a national phase of International Application No. PCT/GB2016/051052 filed Apr. 15, 2016 and published in the English language, which claims priority to United Kingdom Patent Application No. 1507053.5 filed Apr. 24, 2015, which are hereby incorporated herein by reference.

FIELD OF THE INVENTION

The invention relates to a portable clamping device that provides a protrusion to which one or more items may be connected.

BACKGROUND TO THE INVENTION

Frequently, people wear or carry items that they then need to put down in order to undertake a task. For example, when shopping, one might wish to put down bags to have a drink or food, or when a cyclist enters an establishment for a break, they may wish to put down their helmet. Often, the floor is dirty or there is a risk of the item(s) being stolen. Therefore, there is a need to keep the item(s) off the ground and close to hand.

Previously proposed solutions include bag hooks that comprises a weighted flat portion and a hook extending therefrom. The flat portion is positioned on the edge of a table and the hook extends underneath the table top. The item(s) then hang under the table and close to the user. However, in such devices, there is a risk that knocking the device will result in it falling off the table, which is a particular concern where the user gesticulates when talking. Additionally, if the item(s) get knocked there is a risk of the oscillations causing the device to fail and such devices are unable to support large weights because they become unbalanced. Furthermore, the device can easily be stolen by lifting it from the table.

SUMMARY OF THE INVENTION

Accordingly, the present invention is directed to a portable supporting device comprising;
  a body portion;
    a clamp mechanism having two jaws with a variable distance therebetween, wherein the first of the two jaws is connected to the body portion and the second of the two jaws is connected to a stem that is at least partially housed within the body portion and moves therein to adjust the distance between the two jaws; and
  a hook mechanism.

The present invention is allows for a support, which may be in the form of a pin, a hook or a loop, to be fixed to a table top or other surface. The clamp mechanism in the form of adjustable jaws allows the device to clamp about a structure and be retained thereupon, thus forming a convenient location on which to hang an item.

Advantageously, the jaws are independently pivotable relative to the body portion such that each jaw can rotate from a first position substantially parallel to the body portion to a second position approximately 120° therefrom. Allowing the jaws to pivot relative to the body portion and independently from one another allows the clamp mechanism to attach more securely about non-parallel surfaces. Additionally, it provides a system wherein the jaws can be stowed so as to reduce the size of the device for storage. Furthermore, the pivotable jaws allow the device to be installed at an angle.

Preferably, the hook mechanism is pivotable from a first position substantially parallel to the body portion to a second position substantially perpendicular thereto. Where the hook mechanism can be pivoted to a position between substantially parallel to the body of the device or substantially perpendicular thereto, it is possible to create a more compact device that can be stowed in a user's pocket or bag with a reduced risk of the hook mechanism breaking.

In one embodiment, the body portion is provided with at least one recess such that when the jaws are in the first position and/or the hook mechanism are in the first position, they are received within the at least one recess and the external surface of the device is smooth and/or substantially planar. The jaws and/or the hook mechanism of the device are able to be pivoted such that they may be received within a recess in the body portion, thereby reducing the size of the device and making it more compact and portable. By creating a body portion with smooth and/or substantially planar external surfaces, that is to say that the jaw(s) and/or hook are flush with the surface of the body portion such that no parts are protruding therefrom, the device is less bulky and less likely to be damaged when in transit. Additionally, the smooth external surface reduces the risk of the device damaging anything when not in use. Alternatively, the jaws and/or hook mechanism may protrude a small amount with a lip extending above the surface of the body portion in order that it can be used to grip and extract the item from the body portion. The lip provides a surface that a user can engage with a finger nail or the like in order to provide a force to the jaw/hook and extend it from the body portion. In another arrangement, a protrusion may be provided elsewhere on the jaw(s) and/or hook to provide a lever to extend the item from the body portion.

In a preferred arrangement, the second jaw is connected at, or adjacent, one end of the stem and the hook mechanism is connected at or adjacent the other end of the stem. Providing a stem with a jaw at one end of a stem creates a convenient arrangement for adjusting the distance between the two jaws. The stein can be received within the body portion and a control mechanism for adjusting the gap between the jaws can be provided on the length of the stem.

It is advantageous that the device is provided with locking means to lock the jaws relative to one another so that the distance between them is releasably fixed. The provision of locking means allows a user to fix the jaws at a particular distance apart. This may be especially advantageous in reducing the risk of disengagement where the device may be knocked in use.

The locking means may comprise one or more of a group comprising: a releasable ratchet mechanism; a friction connection; a pin; a spring biased pin; a code lock; and a lockable rack and pinion. The locking mechanism may be selected from the aforementioned group or another suitable locking mechanism may be employed.

Preferably, at least one of the jaws is provided with a resiliently yieldable coating on its contact face. The use of a resiliently yieldable coating allows the jaws to clamp to a surface without causing lasting damage because the force is absorbed in the soft resiliently yieldable material. Furthermore, the resiliently yieldable material may be used to increase the friction between the jaw and the surface, thereby reducing the risk of disengagement.

In one arrangement, the hook mechanism is able to rotate relative to the jaws and body portion. This allows the hook mechanism to adjust to the most suitable position for the item(s) to connect to it.

It is advantageous that the hook comprises a loop, and more advantageous that it comprises a gate to allow it to be opened and closed, which may be lockable. The use of a gate allows for a handle or loop in the item to be attached to the device to be readily connected. For example, a clip gate mechanism similar to that used in karabiners may be employed, whereby a biased gate is employed that allows the loop to be opened and closed to thread the item(s) thereon.

The invention extends to a method of using the device.

BRIEF DESCRIPTION OF THE DRAWINGS

An embodiment of the invention will now be described, by way of example only, and with reference to the accompanying drawings, in which:

FIG. 1 is an exploded view of a device according to the present invention;

FIG. 2 is a side view of the device of FIG. 1 in an extended state;

FIG. 3 is a back view of the device of FIG. 2;

FIG. 4 is a side view of the device of FIG. 1 in a closed state;

FIG. 5 is a back view of the device of FIG. 4;

FIG. 6 is a perspective view of the device of FIG. 5.

DETAILED DESCRIPTION OF EXEMPLARY EMBODIMENTS

Figure 7:
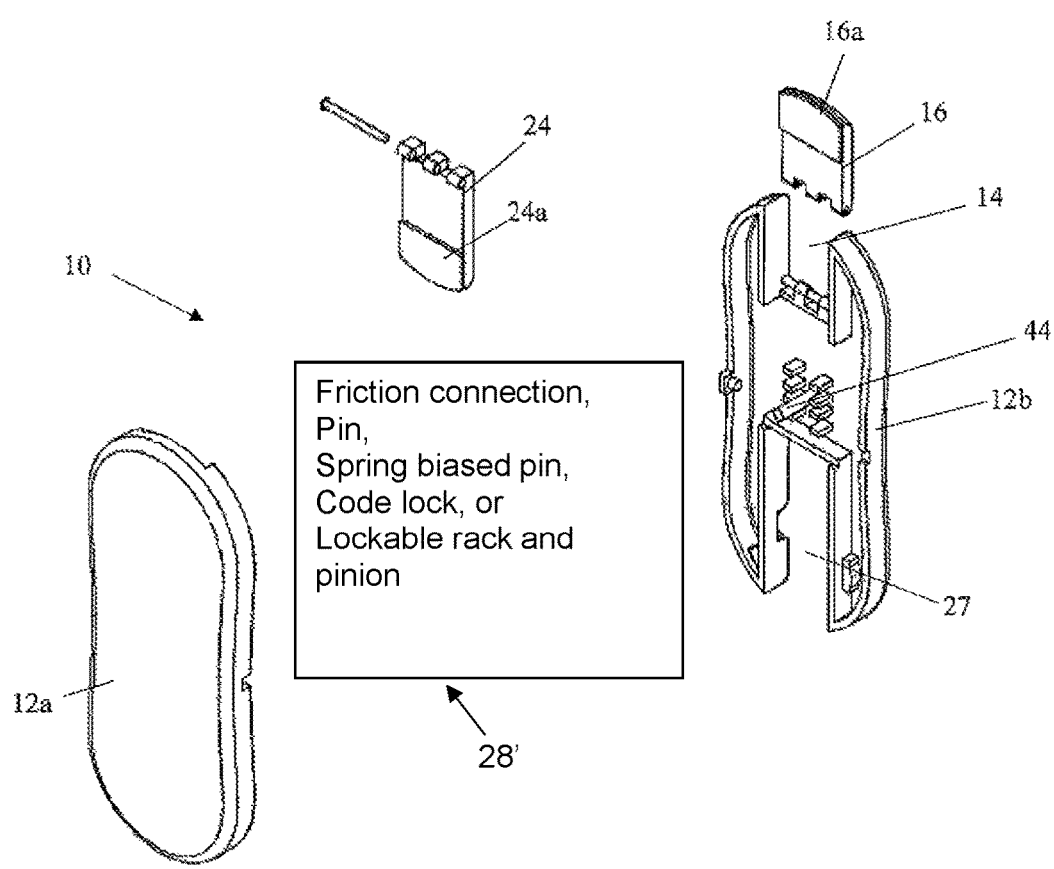
FIG. 7 is an exploded perspective view similar to FIG. 1 but illustrating diagrammatically alternative locking mechanisms that can be used in accordance with the present invention.

FIG. 1 shows a device 10 comprising a body portion in the form of front housing 12a and rear housing 12b. The two housing parts 12a and 12b are adapted to be connected together to form the body portion, in which is housed further parts of the device 10. The rear housing 12b is provided with a jaw recess 14 and within that recess, along the side opposite the opening, is pivotally connected a first jaw 16.

Within the body portion is contained a stem 18, which is provided with a locating slot 20 along its centre. Along at least part of the long sides of the stem 18 are teeth 22a and 22b. A second jaw 24 is pivotally connected at one end of the stem 18 and the other end of the stem 18 is provided with a loop 26 pivotally connected thereto. The loop 26 is provided with a spring-biased gate mechanism to allow it to be opened and closed. The opposite end of the rear housing 12b from that containing the jaw recess 14 is provided with an elongate loop recess 27.

The jaws 16 and 24 are provided with resiliently yieldable material 16a and 24a.

The device 10 is further provided with a locking mechanism 28 to lock the stem 18 in position relative to the body portion. The locking mechanism 28 comprises two locking sections 30a and 30b, each being provided with a respective engaging protrusion 32a and 32b in the form of teeth at one end. Each of the locking sections 30a and 30b comprises a central slot 34a and 34b and a protrusion 36a and 36b extending from the side of the locking section.

The stem 18 passes through the central slots 34a and 34b of the respective locking sections 30a and 30b so that the locking sections surround the stem 18. A connector 38, which has two engaging apertures 40a and 40b within its boundary, and the engaging apertures 40a and 40b of the connector 38 engage respective protrusions 36a and 36b of the locking sections 30a and 30b. The connector 38 is also provided with a pivot aperture 42 arranged between the two engaging apertures 40a and 40b.

A pin 44 is positioned within the rear housing 12b, which extends towards a recess (not shown) in the front housing 12a, and the pivot aperture 42 of the connector 38 is positioned on the pin 44, such that connector 38 can rotated about the pin 44. Because of the positions of the engaging apertures 40a and 40b being each side of the pivot aperture 44, rotation of the connector 38 moves the locking sections 30a and 30b in opposition directions. Movement of the locking sections 30a and 30b in one direction results in the protrusions 32a and 32b engaging the teeth 22a and 22b of the stem 18. Movement of the locking sections 30a and 30b in the opposition direction disengages the protrusions 32a and 32b from the teeth 22a and 22b of the stem 18. The pin 44 is also received within the central locating slot 20 of the stem 18 to keep the stem 18 aligned centrally within the body of the device 10.

Spring 46 is provided within the housing 12 to bias one of the locking sections 30 into the position wherein its protrusion 32 engages the teeth 22 of the stem 18. One of the locking sections 30a and 30b is provided with an extension 48 that passes through the housing 12. Depression of the extension 48 forces the locking sections 30 against the biasing spring 46, which results in disengagement of the protrusions 32 from the teeth 22 of the stem 18, thereby allowing the stem 18 to pass through the central slots 34 of the locking sections 30. Releasing of the extension 48 results in the biasing spring 46 forcing the protrusions 32 into the teeth 22 of the stem 18, thereby locking the stem 18 relative to the housing 12.

The second jaw 24 and the loop 26 are able to pivot to a position adjacent and substantially parallel with the stem 18. In such a position, they are received within the respective jaw recess 14 and the loop recess 27 of the rear housing 12b. Additionally, the first jaw 16 is able to pivot into a position substantially parallel with the surface of the rear housing 12b and, in such a position, the first jaw is received within the jaw recess 14 of the rear housing 12b. In such a position, with both jaws 16 and 24 and the loop 26 pivoted to be substantially parallel with the stem 18 and/or the rear housing 12b, the device 10 has a substantially planar rear external surface.

In use, from a first position wherein the jaws 16 and 24 and the loop 26 are substantially parallel to the rear housing 12b, the first jaw 16 is pivoted to be substantially perpendicular to the rear housing 12b. Similarly, the second jaw 24 and the loop 26 are pivoted to be substantially perpendicular to the stem 18, thereby arranging the device in a second position. The jaws 16 and 24 and the loop 26 may be pivoted to a position less than or more than perpendicular depending upon the requirements.

Once the jaws 16 and 24 are in a perpendicular, or 'open', position, the extension 48 is depressed to release the stem 18 from the locking mechanism 28. The stem 18, and its respective second jaw 26, is then moved within the housing 12 to increase the distance between the two jaws 16 and 24. As the stem 18 moves within the housing, the loop 26 is received within the loop recess 27, thus allowing movement of the stem 18 relative to the housing 12, as shown in FIGS. 2 and 3. Once the gap between the two jaws 16 and 24 is to the required distance, the extension 48 is released and the device 10 is applied to the surface to which it is to be connected by putting one jaw 16 and 24 either side of the surface, for example, a table top (not shown). When the device 10 is arranged with a jaw 16 and 24 on either side, the jaws 16 and 24 are forced towards one another. This may be undertake either with the extension 48 being depressed or, where the locking mechanism comprises a ratchet system by contouring the engaging protrusions 32 accordingly, the extension 48 need not be depressed. Once the jaws are in position such that the yieldable material 16a and 24a is in contact with the surface, the locking mechanism holds the stem 18 in position relative to the body and one or more items may be positioned on the loop 26.

To release the device 10, the extension 48 is depressed and the jaws 16 and 24 are moved apart, thereby increasing the gap between then and allowing the device 10 to be disengaged from the surface. The jaws 16 and 24 and the loop 26 can then be pivoted into the first position and the distance between the jaws 16 and 24 decreased to allow the device 10 to be compactly stowed.

The jaws 16 and 24 may be provided with a range of motion such that they can be positioned substantially touching one another, thereby allowing the device 10 to clamp around thin material such as a sheet of paper, to a position with the loop 26 of the stem 18 being adjacent the closed end of the elongate loop recess 27.

Different locking mechanisms may be used, for example, a combination lock may be used, wherein a code is required before the stem is released. Alternatively, a hole-and-pin arrangement might be used that allows a user to position a pin in a corresponding hole when the stem is in the desired position. In another arrangement, the stem may be held in place using friction and biased release means rather than teeth. Alternative locking mechanisms are illustrated diagrammatically in FIG. 7.

The device may comprise further connection means, for example a key-ring connection to allow for a key-ring to be attached to provide a further connection from which to hang an item.

The jaws may rotate up to 170 degrees from the 'rest' or first position, thereby allowing the clamp to adapt to the contours of the surface to which it is to be attached.

In one embodiment, the loop may be rotatable relative to the stem and/or body portion.

The device may be used for a variety of purposes, for example, for connecting to a bar or table for use by shoppers for hanging bags, cyclists or motorcyclists for hanging helmets and/or gloves or others simply wanting to hang a bag or other item from a surface. Skiers may wish to hold helmets and gloves off the floor using the device when taking a break or they may wish to keep skis together. Additionally, the device may be used as a clamp, for example for holding parts together whilst gluing or to keep cables tidy. The device may be used to hold tools to a work bench or other location or might be employed to hold pipes, cables or lighting. Holiday makers may wish to attach the device to chairs or sunbeds to support items and keep them off the floor/sand and the device may also be used in camping, golf and sailing to support items in convenient locations. The device may further be employed in cars to keep devices and other items held in a useful position.

One or more features of one embodiment of the present invention may be used in combination with, or as an alternative to, one or more features of the present invention.

The invention claimed is:

1. A portable supporting device comprising:
   a body section;
   a clamp mechanism having two jaws with a variable distance therebetween, wherein the first of the two jaws is connected to the body section and the second of the two jaws is connected to a stem that is at least partially housed within the body section and moves therein to adjust the distance between the two jaws; and
   a hook;
   wherein the jaws are independently pivotable relative to the body section such that each jaw can rotate from a first position to a second position;
   wherein the hook is pivotable from a first position to a second position; and
   wherein, the body section is provided with at least one recess such that when the jaws are in the first position and the hook is in the first position, the jaws are received within the at least one recess.

2. A portable supporting device according to claim 1, wherein, when the jaws are in the first position and the hook is in the first position, the external surface of the device is substantially smooth.

3. A portable supporting device according to claim 1, wherein the second jaw is connected at or adjacent one end of the stem and the hook is connected at or adjacent the other end of the stem.

4. A portable supporting device according to claim 1, wherein the device is provided with locking means to lock the jaws relative to one another so that the distance between them is releasably fixed.

5. A portable supporting device according to claim 4, wherein the locking means comprises one or more of a group comprising: a releasable ratchet mechanism; a friction connection; a pin; a spring biased pin; a code lock; and a lockable rack and pinion.

6. A portable support device according to claim 1, wherein at least one of the jaws is provided with a resiliently yieldable coating on its contact face.

7. A portable supporting device according to claim 1, wherein the hook is able to rotate relative to the jaws and body section.

8. A portable supporting device according to claim 1, wherein the hook comprises a loop.

9. A portable supporting device according to claim 8, wherein the loop is provided with a gate to allow for it to be opened and closed.

10. A portable supporting device according to claim 9 wherein the loop may be locked closed.

* * * * *